United States Patent [19]
Cermak

[11] Patent Number: 5,458,368
[45] Date of Patent: Oct. 17, 1995

[54] COLLISION SENSOR AND ACTUATION APPARATUS

[76] Inventor: Ronald Cermak, 290 Whiteside Pl., Thousand Oaks, Calif. 91362

[21] Appl. No.: 184,206

[22] Filed: Jan. 18, 1994

[51] Int. Cl.⁶ .................................................. B60R 21/26
[52] U.S. Cl. ......................... 280/737; 280/734; 180/282
[58] Field of Search .............................. 280/728 R, 734, 280/737 D, 736, 742, 741 R; 180/282; 200/61.5, 61.53, 61.54; 222/5, 3

[56] References Cited

U.S. PATENT DOCUMENTS

| | | | |
|---|---|---|---|
| 3,288,067 | 11/1966 | Madlener et al. | 102/223 |
| 3,744,816 | 7/1973 | Yamaguchi et al. | 280/737 |
| 5,152,550 | 10/1992 | Hoagland et al. | 280/737 |
| 5,230,532 | 7/1993 | Blumenthal et al. | 280/741 |
| 5,362,099 | 11/1994 | Föhl | 280/737 |

*Primary Examiner*—Karin L. Tyson
*Assistant Examiner*—Christopher Ellis
*Attorney, Agent, or Firm*—Michael A. Painter

[57] ABSTRACT

An apparatus for sensing the force of a collision and actuating a vehicle occupant restraint system in response thereto. An actuator piston is slidably mounted within a restraint system module and is disposed intermediate a source of pressurized gas and an inflatable occupant restraint. The actuator piston is maintained in position by a frangible sensor shaft intermediate the source of pressurized gas and the inflatable occupant restraint system. A sensor weight is annularly disposed about the frangible sensor shaft. The sensor weight comprises a non-uniform mass which, when subject to the inertial force of a collision, will transmit a shearing force to the surface of the sensor shaft which is sufficient to fracture or otherwise disrupt the structural integrity of the sensor shaft. When the supporting force imposed upon the actuator piston by the sensor shaft is eliminated, the actuator piston is slidably repositioned thereby opening a conduit intermediate the source of pressurized gas and the inflatable vehicle occupant restraint.

8 Claims, 2 Drawing Sheets

COLLISION SENSOR AND ACTUATION APPARATUS

BACKGROUND OF THE INVENTION

1. Field of the Invention

The present invention generally relates to a sensor and actuating mechanism used to inflate a vehicle occupant restraint system and more particularly to an actuating mechanism which utilizes the inertial force of a non-uniform mass to break a frangible actuating member.

2. Prior Art

Substantially all vehicles currently being marketed include a vehicle occupant restraint *system in the form of one or more inflatable air bags. In all forms of this type of occupant restraint system, a source of pressurized gas is confined within a fixed chamber. Upon sensing a collision having a pre-determined magnitude, the confined gas is released to fluidly fill the inflatable air bags. The inflated air bag will reduce the impact to which the occupants are subjected thereby providing a substantial margin of safety for vehicle occupants.

The prior art discloses a number of mechanical devices used to detect the forces generated by a vehicle collision. Upon sensing a force of predetermined magnitude, this device actuate means for inflating the vehicle occupant restraint system. In one of the mechanisms disclosed by the prior art, a shaft is used to support a frangible metal element, the shaft being held in place by a complex link mechanism. The link mechanism consists of a plurality of coupled projections which are oriented with respect to each other at predetermined, fixed angles. When the integrity of the link mechanism is maintained, the shaft will be held in place and the source of pressurized gas unable to break the frangible metal element. The structure of this sensing and actuating mechanism is inadequate. In order to provide the ability to respond to a collision which imposes a force from any direction, the integrity of the link mechanism depends upon the precise orientation of the coupled projections. The substantial difficulties which are encountered in predicting the direction of a collision force for the purpose of angularly orienting the link mechanism renders the device inadequate for its purpose.

Another category of sensing and actuating mechanisms taught by the prior art utilizes a resiliently biased lever arm which is maintained in its quiescent position through the use of a spherical weight. The spherical weight is located within a bore, the position being maintained by a compression spring. When the inertia of a collision displaces the spherical weight, the resiliently biased lever arm will engage a pin which will be urged against and fragmentize a gas cylinder. When the cylinder is fractured, the source of pressurized gas will be permitted to inflate the occupant restraint system. A problem inherent in this device is its inability to react to an inertial force which will not displace the spherical ball from its initial position (e.g., a force substantially aligned with the compression spring and bore). Since an objective of all passive restraint systems is to provide the ability to react to a collision irrespective of the direction in which the impact occurs, this device is inadequate for its intended purpose.

The present invention substantially overcomes the inadequacies of the devices taught by the prior art. In the present invention, a frangible sensor shaft supports an actuator piston which is used as a valve between a source of pressurized gas and one or more inflatable air bags. A sensing member comprises a sensor weight of non-uniform mass which is secured about the exterior surface of the sensor shaft. The non-uniform mass of the sensor weight will be responsive to inertial forces from any direction. Upon detecting an inertial force of a predetermined magnitude, the sensor weight will impose a lateral shearing force against the surface of the sensor shaft which is sufficient to fragmentize the shaft. When the supporting sensor shaft is fragmentized, the actuator piston will be displaced thereby opening a conduit intermediate the source of pressurized gas and the inflatable air bags.

SUMMARY OF THE INVENTION

The present invention comprises a sensor and actuation apparatus for a vehicle occupant restraint system which can detect the force of a collision irrespective of direction. The sensor and actuation apparatus is mounted within a supply chamber for pressurized gas. The source of pressurized gas is used to inflate air bags which are integral to the restraint system. A chamber in communication with the pressurized gas is closed at one end by an actuator diaphragm fabricated of an impervious material which has a tensile strength which, if not supported along the surface opposite to that in communication with the source of pressurized gas, will be ruptured by a force created by the pressure differential. An actuator piston is slidably disposed within a chamber and aligned with the actuator diaphragm. The actuator piston acts as a valve between the source of pressurized gas and a conduit to the inflatable air bags. A frangible sensor shaft is axially aligned with the actuator piston. In its quiescent state, the sensor shaft supports or otherwise maintains the position of the actuator piston against the actuator diaphragm thereby preventing the diaphragm from rupturing.

The collision sensor employed by the present invention comprises a sensor weight which is securely coupled to the exterior surface of the sensor shaft. The sensor weight comprises a non-uniform mass which is irregularly disposed about the sensor shaft. When subject to the force of impact caused by a collision, a lateral shearing force will be imposed upon the coupling intermediate the sensor weight and sensor shaft causing the sensor shaft to fragment. The fragmentation of the sensor shaft will release the support on the actuator piston, the force imposed by the pressurized gas upon the actuator piston repositioning the piston thereby opening a conduit between the source of pressurized gas and the inflatable air bags.

It is therefore an object of the present invention to provide an improved collision sensor and actuation apparatus for a vehicle occupant restraint system.

It is another object of the present invention to provide an improved collision sensor and actuation system which will actuate a restraint system irrespective of the direction of a collision.

It is still another object of the present invention to provide a collision sensor and actuation apparatus for a vehicle restraint system which may be adopted to respond to a predetermined magnitude of impact.

It is still yet another object of the present invention to provide an improved collision sensor and actuating apparatus for a vehicle restraint system which is simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

Figure 1:
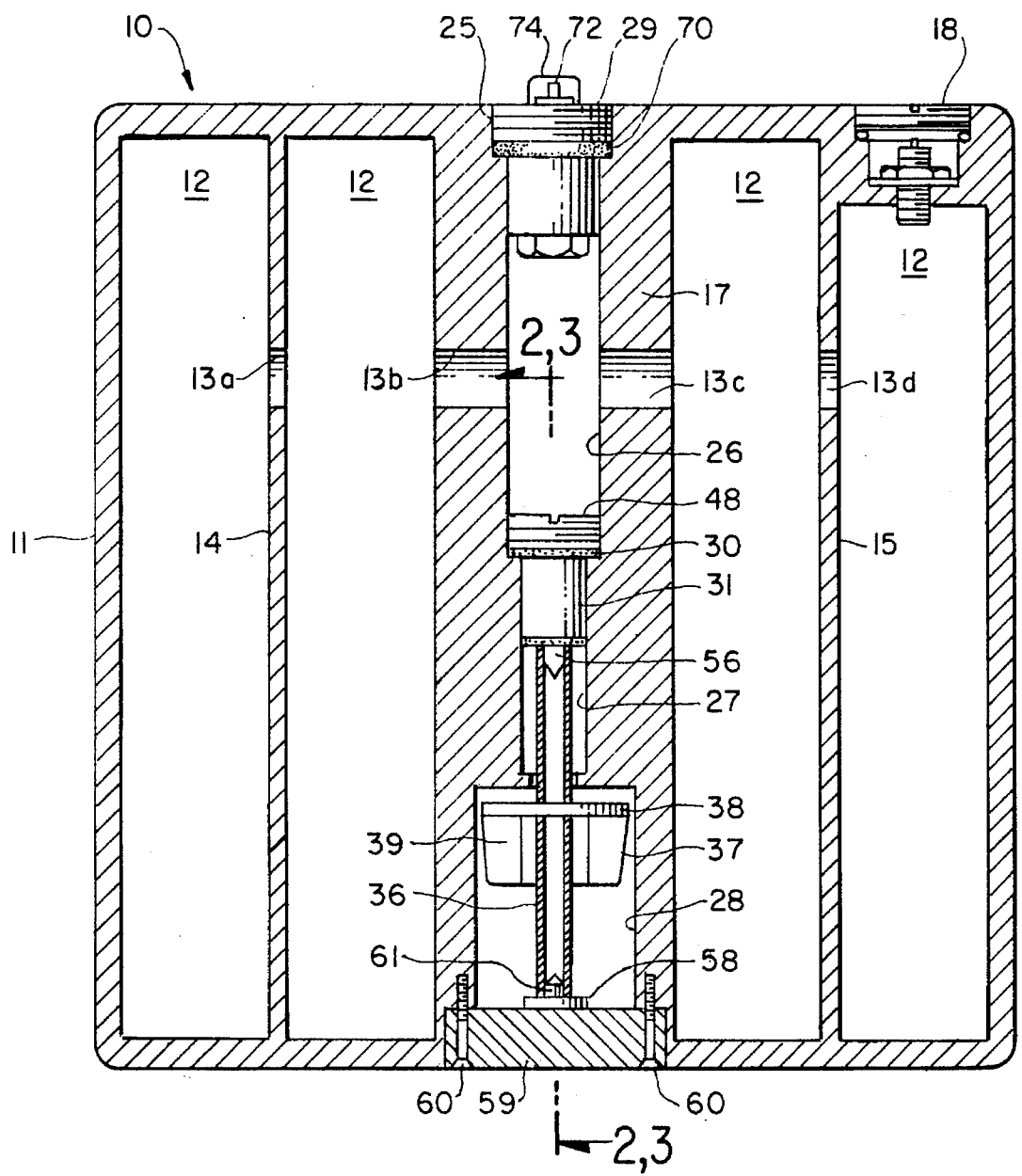
FIG. 1 is a front elevation, partial cross-sectional view of the sensor and actuation module in accordance with the present invention in the unactuated state.

An understanding of the present invention may be best gained by reference to FIG. 1 wherein a front elevation, partial cross-sectional view of the collision sensor and actuation module 10 is shown. The present invention is adapted to sense the magnitude of forces caused by a vehicle collision and, if the forces generated exceed a predetermined level, the present invention will activate a vehicle occupant restraint system.

In the preferred embodiment of the present invention, the vehicle occupant restraint system consists of one or more inflatable air bags (not shown) which are used to prevent the vehicle occupant from making contact with the vehicle steering wheel, dashboard, windshield, etc. The collision sensor and actuation module 10 comprises a sealable enclosure 11 having a plurality of gas supply chambers 12. In the form of enclosure 11 shown in FIG. 1, the plurality of gas supply chambers 12 are formed by structural, interior walls 14 and 15 and a supporting central enclosed wall 17 within which the collision sensor and actuating mechanism is mounted. All gas supply chambers 12 are in communication through the use of supply ports 13a–13d, inclusive.

It is understood the vehicle occupant restraint system is typical of those used in modern vehicles. In such systems, one or more air bags are used as the restraints, the air bags being inflatable through the use of a pressurized supply of a fluid such as air or the like, the selection being one of choice. The source of pressurized gas is introduced into gas supply chambers 12 of collision sensor and actuation module 10 through a conventional supply valve 18.

The sensor and actuating mechanism used to implement the present invention is mounted within central enclosure wall 17. A series of axially aligned, contiguous cylindrical bores 25, 26, 27 and 28 are uniformly disposed through central enclosure wall 17. The axis of cylindrical bores 25, 26, 27 and 28 is in parallel spaced relation between structural interior walls 14 and 15. The upper terminus of cylindrical bore 25 is threaded and is adapted to receive the mating threads of system pressure indicator 29. Although the structure of system pressure indicator 29 will be described in detail hereinbelow, it can be seen that system pressure indicator 29 is in direct communication with the pressurized gas supply and thereby is able to monitor the operating status of this system.

The lower terminus of bore 26 is threaded to receive actuator diaphragm insert 48 and the coupled actuator diaphragm 30. As will be described in detail hereinbelow, actuator diaphragm 30 comprises a layer of an impervious material of a suitable plastic or a metal such as lead which will structurally rupture when subjected to a predetermined pressure differential, an event which will occur upon activation of the system.

Actuator piston 31 is slidably disposed within cylindrical bore 27. In the quiescent, unactuated state, actuator piston 31 will be urged adjacent to and will support the structural integrity of actuator diaphragm 30. In the quiescent state, actuator piston 31 is supported by sensor shaft 36. Sensor shaft 36 is a substantially cylindrical member constructed of a frangible material such as glass, plastic or other conventional material which will be fragmented when subjected to sufficient shearing forces.

Actuation of the present invention system is accomplished through the use of sensor weight 37. Sensor weight 37 is securely mounted about the exterior surface of sensor shaft 36. It is an objective of the present invention to provide means for sensing the forces generated by a vehicle collision irrespective of the direction of the impinging forces. To implement this function, the mass of sensor weight 37 is non-uniform relative to the outer surface of sensor shaft 36. In the preferred form of the present invention, sensor weight 37 is comprised of a disk 38 which uniformly encompasses sensor shaft 36 and a tapered substantially semi-cylindrical flange 39 depending downwardly therefrom. Through a combination of the geometry and non-uniform mass distribution, sensor weight 37 will create the shearing forces necessary to fragment sensor shaft 36 irrespective of the force vectors created by a vehicle collision.

Figure 2:
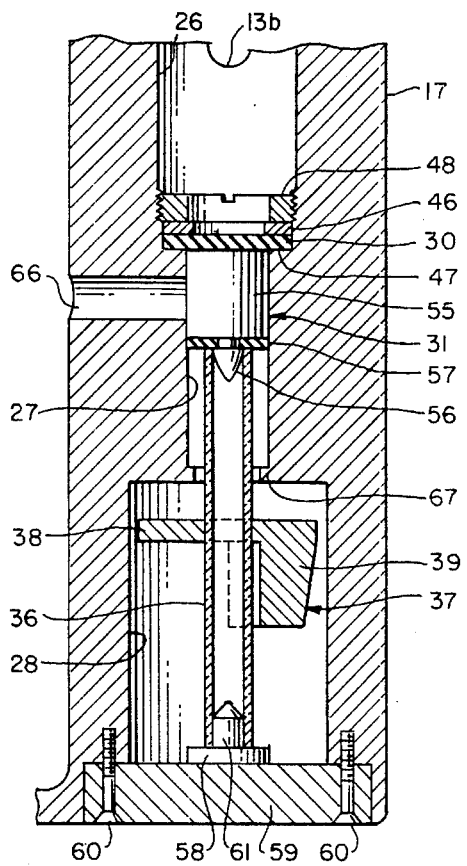
FIG. 2 is an enlarged, partial cross-sectional view of the unactuated sensor and actuator mechanism shown in FIG. 1 taken through line 2—2 of FIG. 1.
Figure 3:
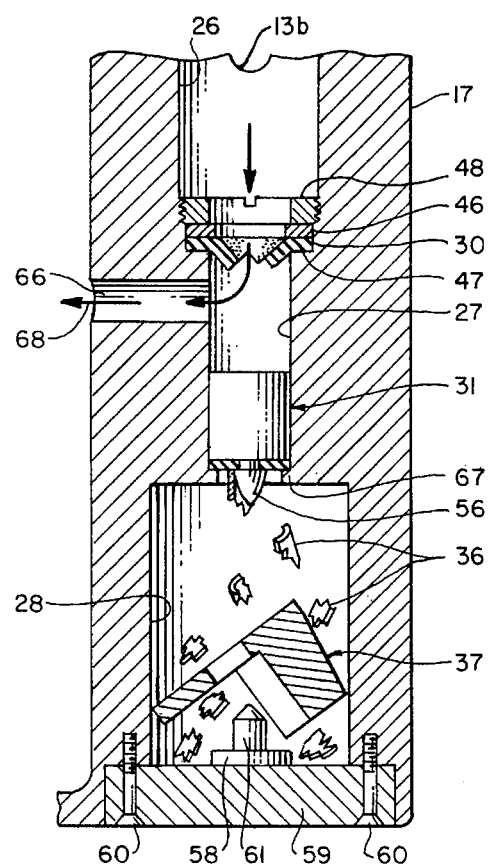
FIG. 3 is an enlarged, partial cross-sectional view of the actuated sensor and actuation mechanism shown in FIG. 1 taken through line 3—3 of FIG. 1.

The operation of the present invention can be best understood by reference to FIG. 2 and FIG. 3 which illustrate the unactuated and actuated states of the sensor and actuation mechanism. In the quiescent state, the pressurized gas supply resident in the gas supply chambers 12, including bore 26, must be fully contained. The inflatable air bags (not shown) are directly coupled to inflation port 66 which is coupled to and is in communication with cylindrical bore 27 through central enclosure wall 17. To maintain the present invention in a state where the restraint system will be activated upon detecting the force of a vehicle collision, actuator diaphragm 30 must form an effective seal against an inadvertent fluid transfer. Actuator diaphragm 30 is a circular disk disposed adjacent diaphragm bushing 46. Diaphragm bushing 46 is an annular disk which allows actuator diaphragm 30 to be in communication with the chamber defined by bore 26 and the source of pressurized gas. The actuator diaphragm 30, diaphragm bushing 46 and diaphragm seal 47 are coupled to actuator diaphragm insert 48 which is secured at the lower terminus of bore 26 by conventional mating threads.

In the unactuated state, actuator diaphragm 30 will be subject to the force created by the pressure differential created by the source of pressurized gas in cylindrical bore 26 versus the unpressurized state existing in cylindrical bore 27 and 28. Though actuator diaphragm 30 is fabricated of a material which is impervious to fluid transfer, it is structurally weak and will rupture unless the force imposed by the pressurized gas is countered by the supporting force of actuator piston 31. As can be seen in FIG. 2, actuator piston 31 comprises a cylindrical member 55 which is adapted to be slidably disposed within cylindrical bore 27. The upper surface of cylindrical member 55 is a uniformly planar surface which is perpendicular to the cylindrical axis of actuator piston 31. The bottom surface of cylindrical member 55 depends downwardly into a tapered projection 56 which is also uniformly aligned about the cylindrical axis of actuator piston 31. As will be explained in detail hereinbelow, in the unactuated state, projection 56 is disposed within and in contact with the upper terminus of cylindrical sensor shaft 36 and is in axial alignment therewith.

In the unactuated state shown in FIG. 2, the upper terminus of sensor shaft 36 circumscribes projection 56 thereby preventing inadvertent lateral movement between actuator piston 31 and sensor shaft 36. To further insure the integrity of the interface between sensor shaft 36 and actuator piston 31, a resilient piston interface pad 57 is affixed to the bottom surface of cylindrical member 55. Pad 57 is in direct contact with the upper terminus of sensor shaft 36 when the system is in the unactuated state.

Sensor shaft 36 is fabricated from a frangible material which is easily fragmented when predetermined shearing forces are applied to the external surface thereof. As explained, the force which is used to fracture sensor shaft 36 is provided by the inertia of sensor weight 37 resulting from the displacement of sensor weight 37 upon the occurrence of a vehicle collision. As can be seen in FIG. 2, sensor shaft 36 is disposed between actuator piston 31 and sensor shaft support 58. Sensor shaft support 58 is secured within base panel 59. To provide access to the chamber created by bore 28, base panel 59 is removeably coupled to central enclosure wall 17 by conventional bolts 60. Stud 61 serves the same purpose as projection 56. Stud 61 depends upwardly from sensor shaft support 58 and is axially aligned therewith. Stud 61 is adapted to be insertable in the lower terminus of sensor shaft 36 and will prevent inadvertent lateral movement of sensor shaft 36 while in the unactuated state.

An object of the present invention is to insure the present invention will activate a vehicle occupant restraint system irrespective of the direction of force vectors created by a vehicle collision. This objective is achieved through the use of sensor weight 37 and the associated structure. As can be best seen in FIG. 2, sensor weight 37 comprises a substantially cylindrical disk 38 which is integral to a downwardly depending, partial cylindrical flange 39. In the preferred form of the present invention, the outer surface of depending flange 39 is tapered inwardly from its interface with disk 38. It is understood the objective of the present invention will be met so long as cylindrical disk 38 depends downwardly into a flange having a non-uniform mass. In the form of sensor weight 37 shown in FIGS. 1, 2 and 3, the geometric configuration of the depending flange 39 exhibits a center of mass which is displaced from the axis of sensor shaft 36.

An understanding of the actuated state of the present invention may be best gained by reference to FIG. 3. As described hereinabove, in the unactuated state, the fluid pressure in the chamber defined by bore 26 is greater than the fluid pressure existing in the chambers defined by cylindrical bores 27 and 28. The rupture of actuator diaphragm 30 is prevented only so long as sensor shaft 36 maintains its quiescent position and imposes a supporting force upon actuator piston 31. When the forces created by a vehicle collision exceed a predetermined magnitude, the inertial forces created by displacement of the non-uniform mass of sensor weight 37 will create sufficient shearing forces to fragment the frangible sensor shaft 36.

In the quiescent state, the pressure in gas supply chambers 12 and the chambers defined by bores 25 and 26 exceeds the pressure in the chambers defined by cylindrical bores 27 and 28. Once sensor shaft 36 is fragmented, the supporting force imposed by actuator piston 31 on actuator diaphragm 30 will be removed thereby resulting in the rupture of actuator diaphragm 30. The pressure differential will cause actuator piston 31 to be urged downwardly to the supporting edge 67 of bore 27 thereby allowing the pressurized gas to flow through bore 27 and inflation port 66 in the direction indicated by reference numeral 68. As stated hereinabove, the fluid flow through inflation port 66 to the inflatable air bags will result in activation of the vehicle occupant restraint system.

Figure 4:
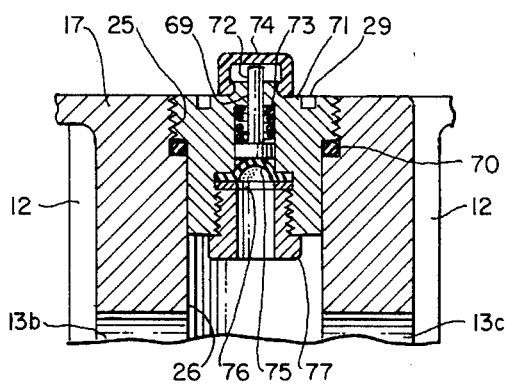
FIG. 4 is a cross-sectional view of the actuating pressure status module shown in FIG. 1 in the unactuated condition.

Since it is essential the present invention be in a consistently operable state, it is essential that means be provided to monitor the status of the pressurized gas supply. An understanding of the operation of a system pressure indicator used with the present invention may be best gained by reference to FIG. 4 and FIG. 5. FIG. 4 illustrates the state of the system pressure indicator 29 in the unactuated state where gas supply chambers 12 have been pressurized. As stated hereinabove, the chamber defined by cylindrical bore 26 will be pressurized at the same magnitude as gas supply chambers 12 since all are in communication through supply ports 13b and 13c. Cylindrical plug 71 of system pressure indicator 29 is threaded within bore 25. A fluid leak between pressurized chambers 12 and the ambient environment is precluded by a conventional, resilient seal 70.

An axial bore 69 is disposed through plug 71, indicator pin 72 being disposed therethrough. Indicator pin 72 is resiliently biased by helical spring 73. When helical spring 73 is compressed, the terminus of indicator pin 72 may be viewed through transparent cap 74. The orientation of indicator pin 72 is controlled by expandable indicator diaphragm 75. Indicator diaphragm 75 is fabricated from an expandable, impervious material which may be plastically deformed when subject to a pressure differential. Indicator diaphragm 75 is maintained in position through a bushing 76 and a sealing plug 77 which is threadingly engaged to a portion of the interior bore of plug 71. In the unactuated state, the normal pressure of the gas being stored in gas supply chambers 12 and cylindrical chamber 25 in communication through supply ports 13a–13d, inclusive, will deform indicator diaphragm 75 in the manner shown in FIG. 4. So long as the force of the pressurized gas deforms indicator diaphragm 75, it will impose sufficient force upon indicator pin 72 to compress helical spring 73 thereby permitting the tip of indicator pin 72 to be viewed through transparent cap 74.

Figure 5:
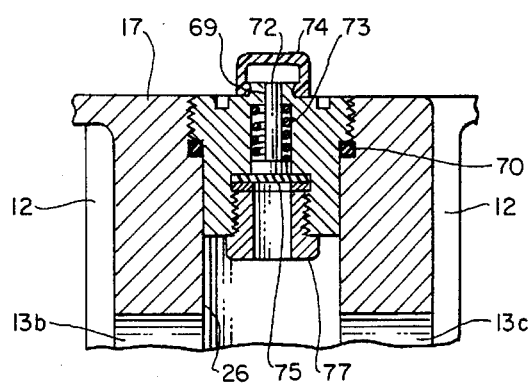
FIG. 5 is a cross-sectional view of the actuating pressure status module shown in FIG. 1 in the actuated condition.

FIG. 5 illustrates the state of the present invention system after a pressure loss due to activation or malfunction. After inflation of the vehicle occupant restraint system, the pressure remaining in supply chambers 12 will be insufficient to deform indicator diaphragm 75. As can be seen in FIG. 5, when indictor diaphragm 75 is not deformed, indicator pin 72 will be urged downwardly by the force imposed by helical spring 73. When indicator pin 72 is forced downwardly, the system is unpressurized and requires maintenance.

It can therefore be seen the present invention comprises an improved collision sensor and activation apparatus for a vehicle occupant restraint system. Through the use of a collision sensor having a non-uniform mass, a collision may be detected irrespective of direction. The combination of a frangible sensor shaft 36 in combination with the non-uniform mass of sensor weight 37 provides means for actuating an air bag system which is substantially improved over those devices taught by the prior art.

I claim:

1. A collision sensor and actuator apparatus for use with an inflatable vehicle occupant restraint system comprising:

(a) a sealable housing adapted to be charged with pressurized gas, said housing including a first chamber in communication with the pressurized gas and a second chamber having a conduit in communication with the inflatable vehicle occupant restraint system;

(b) a breakable seal secured in said housing between said first and second chambers;

(c) an activating piston slidably disposed within the second chamber and adapted to be urged adjacent the breakable seal;

(d) frangible means for supporting said activating piston adjacent the breakable seal disposed intermediate said activating piston and said housing, said frangible means for supporting comprising a frangible cylindrical member being disposed between the activating piston and housing in uniform alignment with said second chamber; and (e) impact sensing means for releasing said means for supporting said activating piston, said impact sensing means being coupled to said frangible cylindrical member.

2. A collision sensor and actuator apparatus defined in claim 1 wherein said impact sensing means comprises a sensor weight defined by a non-uniform mass coupled about the frangible cylindrical member.

3. A collision sensor and actuator apparatus as defined in claim 2 wherein said sensor weight comprises a cylindrical disk having an aperture disposed axially therethrough which is secured about the frangible cylindrical member, a portion of the bottom of said disk depending downwardly into a tapered flange in non-uniform relationship to a portion of said frangible cylindrical member.

4. A collision sensor and actuator apparatus for use with an inflatable vehicle occupant restraint system consisting of inflatable bags comprising:

(a) a sealable housing having an outer wall enclosing a plurality of gas supply chambers adapted to be charged with pressurized gas, said gas supply chambers being in communication with one another and a cylindrical central enclosure wall being disposed within said housing, said central enclosure wall circumscribing axially aligned first and second cylindrical chambers, a first conduit being disposed through the central enclosure wall intermediate said first cylindrical chamber and at least one of said gas supply chambers and a second conduit being disposed through said central enclosure wall intermediate said second cylindrical chamber and the outer wall of the housing;

(b) breakable, sealing means for preventing the flow of pressurized gas disposed between the first and second cylindrical chambers;

(c) a cylindrical activating piston slidably disposed within the second cylindrical chamber, said cylindrical activating piston having top and bottom cylindrical surfaces perpendicular to the longitudinal axis of said second cylindrical chamber, the top surface being adapted to be placed adjacent said sealing means;

(d) a frangible cylindrical member axially mounted within the second cylindrical chamber between the bottom surface of the cylindrical activating piston and the outer wall of the housing whereby a supporting force is maintained between the top surface of the cylindrical activating piston and said breakable sealing means; and (e) impact sensing means for releasing the supporting force for said activating piston coupled to the frangible cylindrical member.

5. A collision sensor and actuator apparatus as defined in claim 4 wherein the second cylindrical chamber communicates with the inflatable bags through the second conduit.

6. A collision sensor and actuator apparatus as defined in claim 4 wherein said impact sensing means comprises a sensor weight defined by a non-uniform mass.

7. A collision sensor and actuator apparatus as defined in claim 6 wherein said sensor weight comprises a cylindrical disk having an aperture disposed axially therethrough which is secured about the frangible cylindrical member, a portion of the bottom of said disk depending downwardly into a tapered flange in non-uniform relationship to a portion of said frangible cylindrical member.

8. A collision sensor and actuator apparatus as defined in claim 4 further including a pressure indicator coupled through the outer wall of said housing and in communication with said first cylindrical chamber.

* * * * *